(12) United States Patent
Ku et al.

(10) Patent No.: US 8,213,072 B1
(45) Date of Patent: Jul. 3, 2012

(54) ELECTROFLUIDIC DISPLAY DEVICE AND DRIVING METHOD THEREOF

(75) Inventors: Yun-Sheng Ku, Miaoli County (TW); Wei-Yuan Cheng, New Taipei (TW); Shu-Wei Kuo, New Taipei (TW); Hsin-Hung Lee, New Taipei (TW); Kuo-Lung Lo, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/074,008

(22) Filed: Mar. 29, 2011

(30) Foreign Application Priority Data

Dec. 29, 2010 (TW) .............................. 99146619 A (51) Int. Cl.
  *G02F 1/03* (2006.01)
  *G02B 26/02* (2006.01)
(52) U.S. Cl. ........ 359/253; 359/228; 359/237; 359/245; 359/272; 359/254; 345/6; 345/32; 257/192
(58) Field of Classification Search .................. 359/227, 359/228, 237, 245, 252–254, 272, 290; 345/173–175, 207; 347/68, 72; 438/29; 257/98, 192, 194, E21.211, E29.127
See application file for complete search history.

(56) References Cited

U.S. PATENT DOCUMENTS

| | | | |
|---|---|---|---|
| 6,700,556 B2* | 3/2004 | Richley et al. | 345/84 |
| 7,521,732 B2* | 4/2009 | Matocha et al. | 257/192 |
| 7,543,918 B2* | 6/2009 | Katayama et al. | 347/68 |
| 2009/0232509 A1 | 9/2009 | Heikenfeld et al. | |
| 2010/0163900 A1* | 7/2010 | Seo et al. | 257/98 |

FOREIGN PATENT DOCUMENTS

TW 200912238 3/2009
TW 200919401 5/2009

OTHER PUBLICATIONS

Hekenfeld et al., "Electrofluidic displays using Young-Laplace transposition of brilliant pigment dispersions", Nature photonics, Apr. 26, 2009, pp. 1-5.
Song et al., "A scaling model for electrowetting-on-dielectric microfluidic actuators", Microfluidics Nanofluidics Research Report, Nov. 12, 2008, pp. 75-89.
R. B. Fair, "Digital microfluidics: is a true lab-on-a-chip possible?", Microfluidics Nanofluidics Review, Mar. 8, 2007, pp. 245-281.
Kuo et al., "Single layer multi-color electrowetting display by using ink jet printing technology and fluid motion prediction with simulation", 2010 SID, May 23, 2010, 939-942.

* cited by examiner

*Primary Examiner* — Loha Ben
(74) *Attorney, Agent, or Firm* — Jianq Chyun IP Office (57) ABSTRACT

An electrofluidic display device including a first structure layer and a second structure layer is provided. The first structure layer includes a first substrate. A trench structure layer is disposed on the first substrate and has a trench surrounding an indent groove of a second substrate. A first electrode layer is disposed on the first substrate. A first hydrophobic layer is disposed on the first electrode layer. The second structure layer having the second substrate is located aside the first substrate with a gap. A groove structure layer is disposed on the second substrate. The groove structure has the indent groove surrounded by the trench. A second electrode layer is disposed on the groove structure layer. A second hydrophobic layer is disposed on the second electrode layer. Polar fluid is disposed in the indent groove. Non-polar fluid is disposed in the gap between the first and second substrates.

22 Claims, 11 Drawing Sheets

ELECTROFLUIDIC DISPLAY DEVICE AND DRIVING METHOD THEREOF

CROSS-REFERENCE TO RELATED APPLICATION

This application claims the priority benefit of Taiwan application serial no. 99146619, filed on Dec. 29, 2010. The entirety of the above-mentioned patent application is hereby incorporated by reference herein and made a part of this specification.

BACKGROUND

1. Field of the Disclosure

The disclosure relates to an electrofluidic display technique.

2. Description of Related Art

An electrofluidic display device is driven by varying an interface between polar fluid and non-polar fluid by applying an electric field.

Figure 1A:
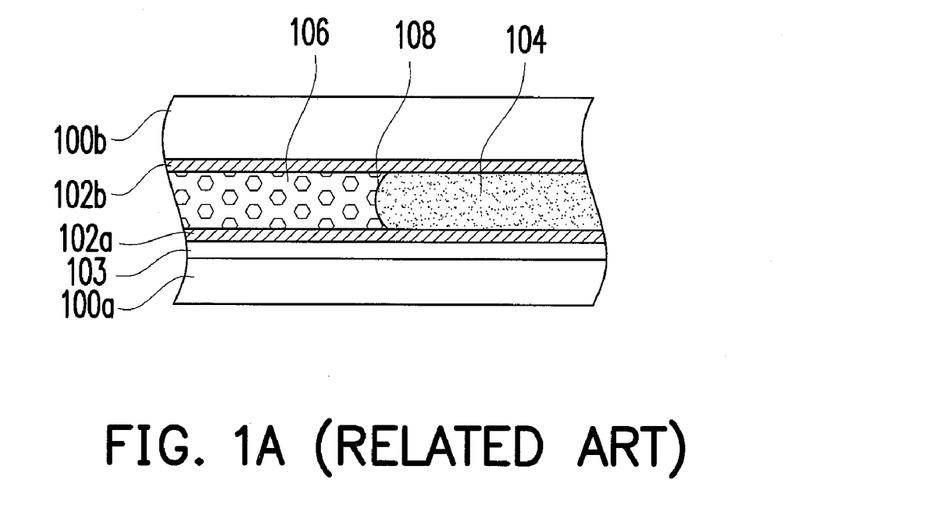
FIGS. 1A-1B are schematic diagrams illustrating a driving mechanism of a conventional electrofluidic display device.
Figure 1B:
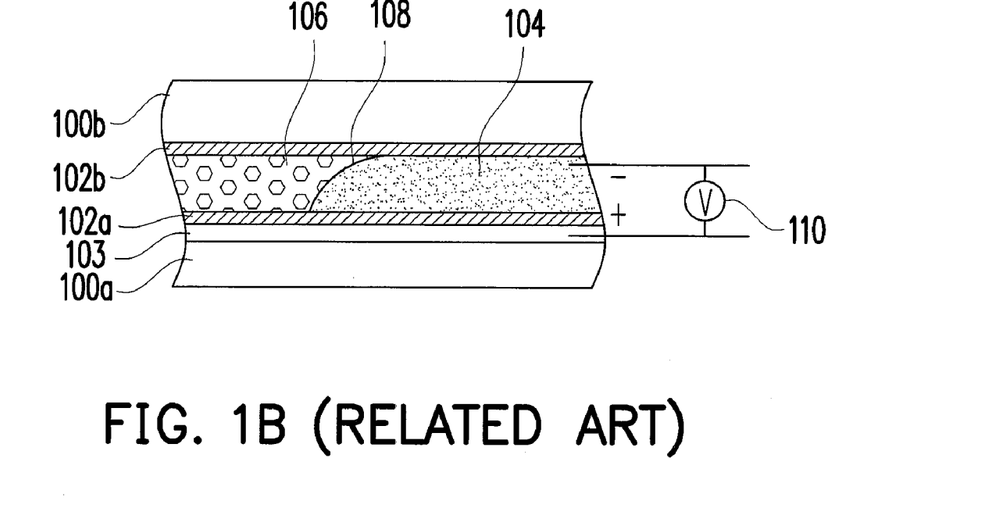

FIGS. 1A-1B are schematic diagrams illustrating a driving mechanism of a conventional electrofluidic display device. Referring to FIG. 1A, polar fluid 104 and non-polar fluid 106 are filled between two transparent substrate 100a and 100b to form an interface 108. The polar fluid 104 is, for example, water containing pigment or colorant. The non-polar fluid 106 is, for example, transparent oil. Hydrophobic layers 102a and 102b are disposed on the two substrate 100a and 100b and contact the polar fluid 104 and the non-polar fluid 106 to form a convex interface. Moreover, an electrode layer 103 is disposed between the substrate 100a and the hydrophobic layer 102a. When an operating voltage is not applied, the polar fluid 104 is convergent due to surface tension of the hydrophobic layers.

Referring to FIG. 1B, when the polar fluid 104 is taken as a ground terminal, and a voltage 110 is applied to the electrode layer 103, the interface 108 is inclined under a function of the electric field, so that the polar fluid 104 is driven to move leftwards. An area covered by the polar fluid 104 presents a color of the added pigment or colorant.

Figure 2A:
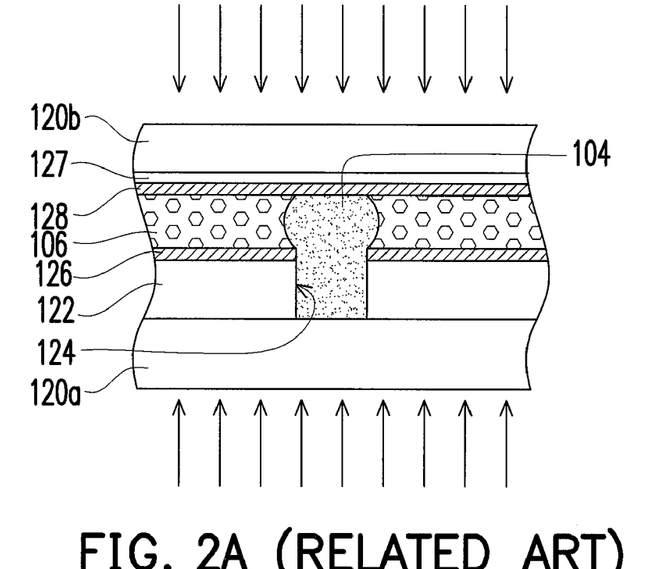
FIGS. 2A-2B are structural schematic diagrams of a conventional electrofluidic display device.
Figure 2B:
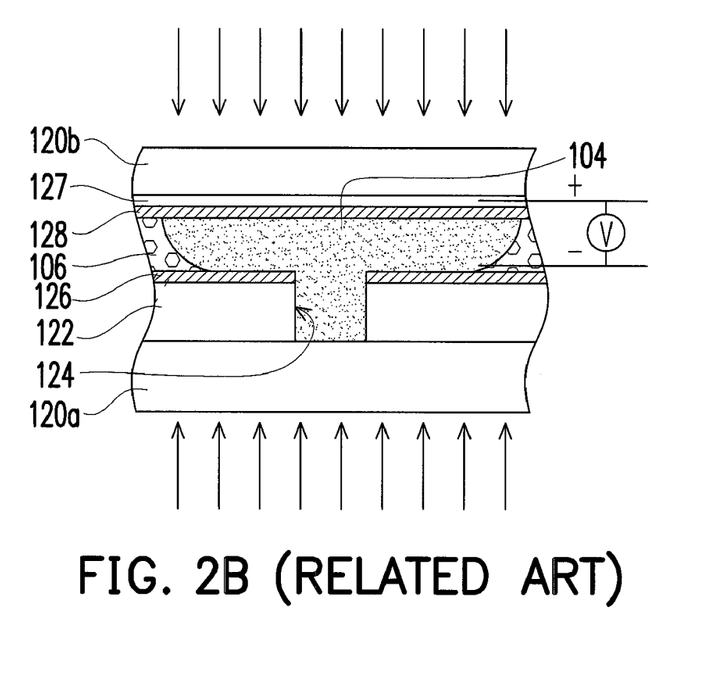

The above driving mechanism can be used to design a display device. FIGS. 2A-2B are structural schematic diagrams illustrating of a conventional electrofluidic display device. Referring to FIG. 2A, an insulating material layer 122 is disposed on a transparent substrate 120a. The insulating material layer 122 has a groove 124. A hydrophobic layer 126 is disposed on the insulating material layer 122. An electrode layer 127 and a hydrophobic layer 128 are disposed on another substrate 120b. The electrode layer 127 can be a transparent conductive material, for example, indium tin oxide (ITO). Polar fluid 104 is disposed between the groove 124 and the hydrophobic layers 126 and 128, and non-polar fluid 106 is disposed between the two hydrophobic layers 126 and 128, and forms an interface balance with the polar fluid 104. The polar fluid 104 is, for example, water doped with pigment or colorant. The non-polar fluid 106 can be transparent fluid, for example, oil. When none voltage is applied, the polar fluid 104 is convergent in the groove 124 due to surface tension of the hydrophobic layers. Materials of the substrates are also transparent materials. The incident light may maintain its original color, for example, a white color to pass through the substrates 120a and 120b, the electrode layer 127 and the transparent non-polar fluid 106.

Referring to FIG. 2B, when the polar fluid 104 is regarded as the ground terminal, and a positive voltage is applied to the electrode layer 127, the polar fluid 104 is driven to move outwards from the groove 124 and distributed to other regions of the groove 124. Since the polar fluid 104 contains pigment and colorant, when the light passes through the polar fluid 104, the light present the color of the pigment or the colorant. When the voltage supply stop applying, the polar fluid 104 is pushed back to the groove 124 due to the function between the polar fluid 104 and the hydrophobic layers.

Figure 3A:
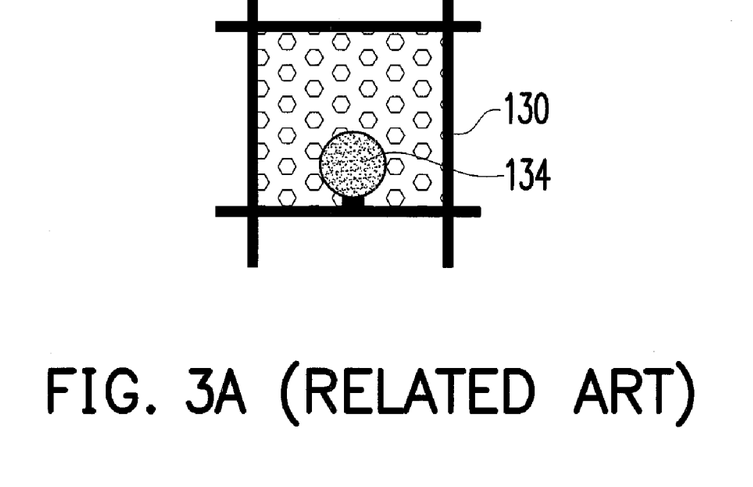
FIGS. 3A-3B are schematic diagrams illustrating an operation mechanism of a conventional electrofluidic display panel.
Figure 3B:
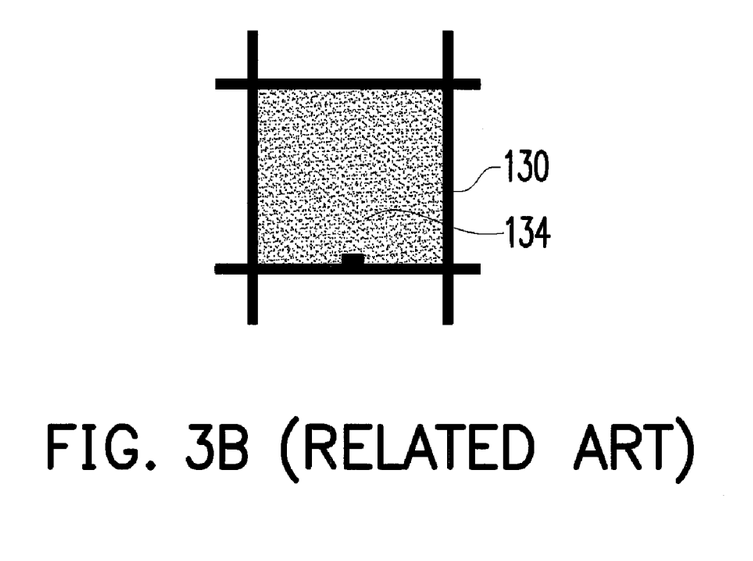

A conventional electrofluidic display panel is formed by a plurality of electrofluidic display devices arranged in an array. FIGS. 3A-3B are schematic diagrams illustrating an operation mechanism of the conventional electrofluidic display panel. Referring to FIG. 3A, each pixel has polar fluid 134 disposed in a groove, and non-polar fluid is filled to surround the polar fluid 134, and ducts 130 are disposed around the pixel, and the non-polar fluid is filled in the ducts 130 to separate each of the pixels during a driving process. When the operating voltage is not applied, the polar fluid 134 is maintained in the groove. Referring to FIG. 3B, when the operating voltage is applied, the polar fluid 134 is pulled out from the groove and distributed all over the pixel area. Since the polar fluid 134 is doped with pigment or colorant, a color display effect is achieved. The ducts 130 are used to avoid mutual interference of the polar fluids during the driving process.

SUMMARY OF THE DISCLOSURE

An exemplary embodiment of the disclosure provides an electrofluidic display device including a first structure layer and a second structure layer. The first structure layer includes a first substrate. A trench structure layer is disposed on the first substrate and has at least one trench correspondingly surrounding an indent groove of a second substrate. A first electrode layer is disposed on the first substrate, and is conformal with the at least one trench. A first hydrophobic layer is disposed on the first electrode layer, and is conformal with the at least one trench. The second structure layer includes the second substrate, and is located at one side of the first substrate with a gap. A groove structure layer is disposed on the second substrate. The groove structure layer has the indent groove surrounded by the trench of the first substrate. A second electrode layer is disposed on the groove structure layer. A second hydrophobic layer is disposed on the second electrode layer. Polar fluid is disposed in the indent groove and contacts the first hydrophobic layer. Non-polar fluid is disposed in the gap between the first substrate and the second substrate.

An exemplary embodiment of the disclosure provides an electrofluidic display device including a first structure layer and a second structure layer. The first structure layer includes a first substrate. A first electrode layer is disposed on the first substrate. A first hydrophobic layer is disposed on the first electrode layer. The second structure layer includes a second substrate, and is located at one side of the first substrate with a gap. A groove structure layer is disposed on the second substrate. The groove structure layer has an indent groove and at least one trench surrounding the indent groove. A second electrode layer is disposed on the groove structure layer, and is conformal with the at least one trench. A second hydrophobic layer is disposed on the second electrode layer, and is conformal with the at least one trench. Polar fluid is disposed in the indent groove and contacts the first hydrophobic layer. Non-polar fluid is disposed in the gap between the first substrate and the second substrate.

An exemplary embodiment of the disclosure provides an electrofluidic display device including a first structure layer and a second structure layer. The first structure layer includes a first substrate and a first electrode structure layer including a first electrode layer and disposed on the first substrate. The second structure layer includes a second substrate located at one side of the first substrate with a gap, and includes a second electrode structure layer including a second electrode layer and disposed on the second substrate, wherein the second electrode structure layer has an indent groove. Polar fluid is disposed in the indent groove and contacts the first electrode structure layer. Non-polar fluid is disposed in the gap between the first substrate and the second substrate. At least one of the first electrode structure layer and the second electrode structure layer has at least one trench surrounding the indent groove.

An exemplary embodiment of the disclosure provides a driving method of an electrofluidic display device. A voltage signal is applied between a first electrode layer and a second electrode layer, and a first voltage is applied to drive polar fluid to flow, so that a fluid interface is moved to a balance point of a trench.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

A plurality of exemplary embodiments is provided below to describe the disclosure, and the following exemplary embodiments can be suitably combined.

Figure 4A:
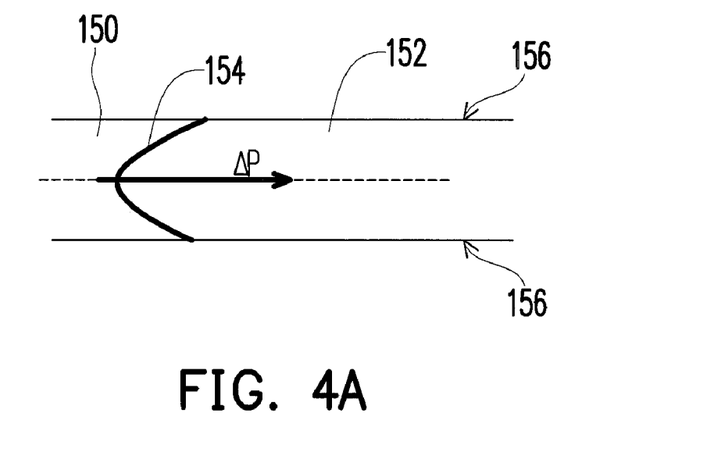
FIGS. 4A-4C are schematic diagrams illustrating a fluid driving mechanism of an electrofluidic display device according to an exemplary embodiment of the disclosure.
Figure 4B:
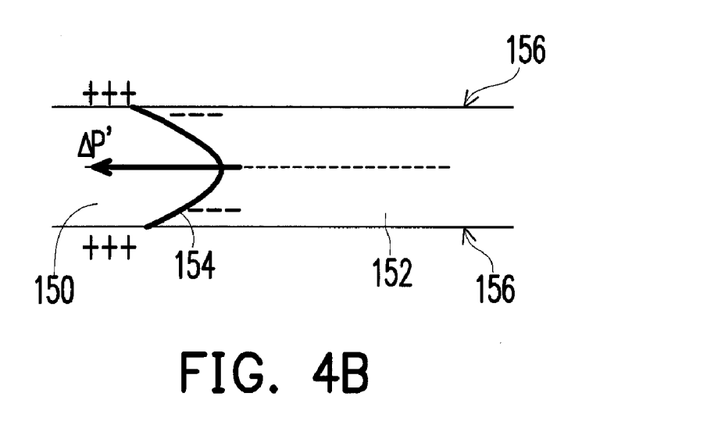
Figure 4C:
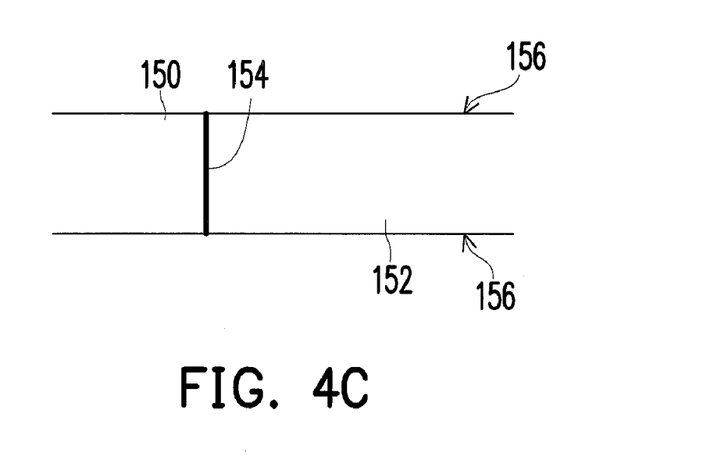

FIGS. 4A-4C are schematic diagrams illustrating a fluid driving mechanism of an electrofluidic display device according to an exemplary embodiment of the disclosure. Referring to FIG. 4A, for example, a balanced fluid interface 154 is formed between non-polar fluid 150 and polar fluid 152 disposed between two hydrophobic layers 156. The non-polar fluid 150 is, for example, oil, and the polar fluid 152 is, for example, water. Due to a function of the hydrophobic layers 156, in case where no voltage is applied, a rightward pulling force $\Delta P$ is generated on the fluid interface 154 due to surface tension. Referring to FIG. 4B, when a voltage is applied between the two hydrophobic layers 156 to generate an electric field, a leftward driving force $\Delta P'$ is generated. When the force $\Delta P'$ is greater than the force $\Delta P$, the fluid interface 154 is moved leftwards, and the polar fluid 152 is driven to move leftwards. Referring to FIG. 4C, when the forces $\Delta P'$ and $\Delta P$ are balanced, the fluid interface 154 is maintained on a fixed position.

Figure 5A:
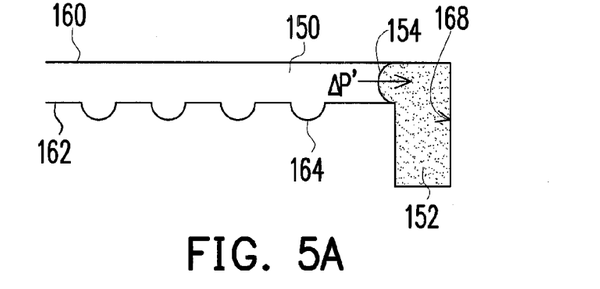
FIGS. 5A-5D are cross-sectional views of a gray-level display driving mechanism according to an exemplary embodiment of the disclosure.

According to the above mechanism, if a stable balance state can be effectively generated according to the structure of the hydrophobic layers 156, a gray-level display function can be achieved. FIGS. 5A-5D are cross-sectional views of a gray-level display driving mechanism according to an exemplary embodiment of the disclosure. Referring to FIG. 5A, the fluid interface 154 is formed between the polar fluid 152 doped with pigment or colorant and the non-polar fluid 150 located between a first hydrophobic layer 160 and a second hydrophobic layer 162. The polar fluid 152 is disposed in a containing space of an indent groove 168. At least a trench 164 is formed on the second hydrophobic layer 162. When the electric field does not exist between the second hydrophobic layer 162 and the first hydrophobic layer 160, the force $\Delta P'$ exerted on the fluid interface 154 is produced by the surface tension of the first hydrophobic layer 160 and the second hydrophobic layer 162, and pulls the polar fluid 152 back to the containing space.

Figure 5B:
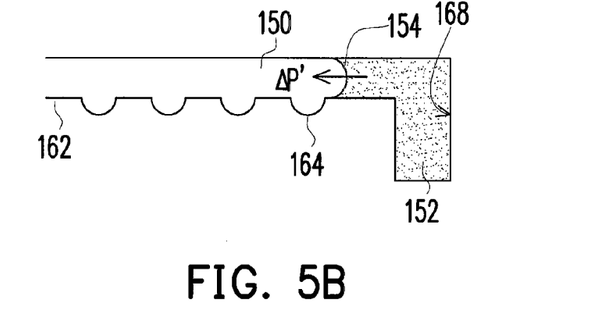

Referring to FIG. 5B, when a voltage difference is applied between the second hydrophobic layer 162 and the first hydrophobic layer 160, a leftward pulling force is generated on the fluid interface 154 to drive the polar fluid 152 to flow leftwards.

Figure 5C:
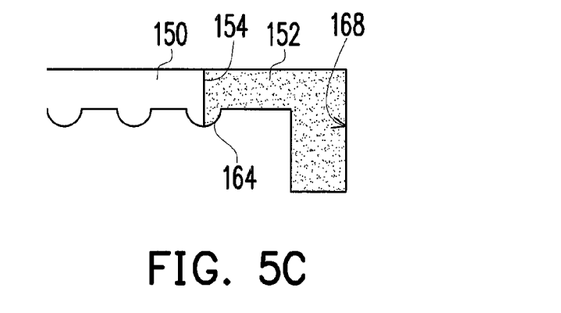

Referring to FIG. 5C, when the fluid interface 154 is moved to the trench 164, an area of the fluid interface 154 is expanded due to the trench 164, so that the fluid interface 154 reaches a balance position. Now, since the driving force is counteracted by a function of the trench 164, a balance point is reached in the trench 164, where the balance point is generally a lowest point of the trench 164. Therefore, the polar fluid 152 is driven to the position of the first trench 164 to implement the desired gray-level display.

Figure 5D:
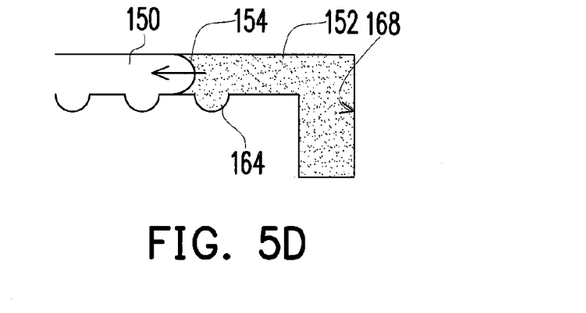

Referring to FIG. 5D, if the desired gray-level display is greater than an area covered by the first trench 164, the balance state of FIG. 5C can be destroyed, so that the fluid interface 154 can move towards another trench 164 to reach the required gray-level display effect.

Figure 6:
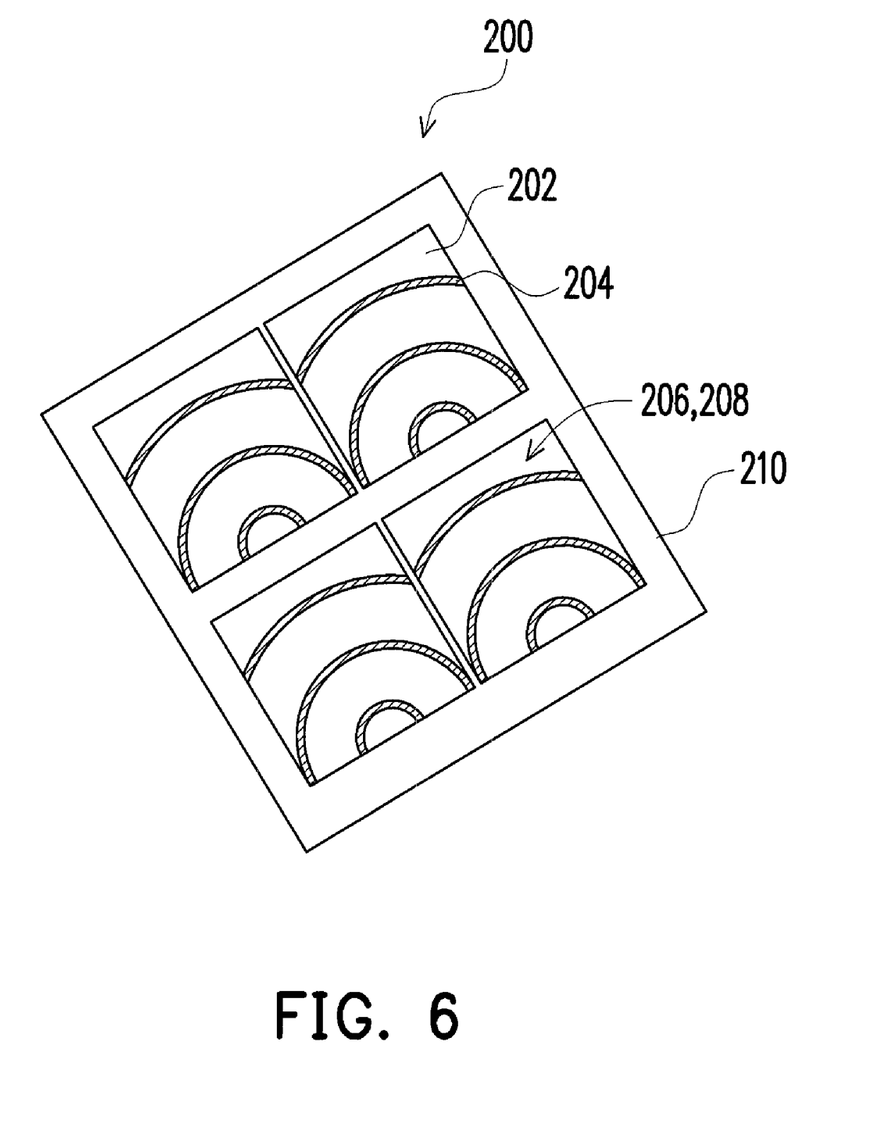
FIG. 6 is a structural perspective view of a first structure layer according to an exemplary embodiment of the disclosure.
Figure 7A:
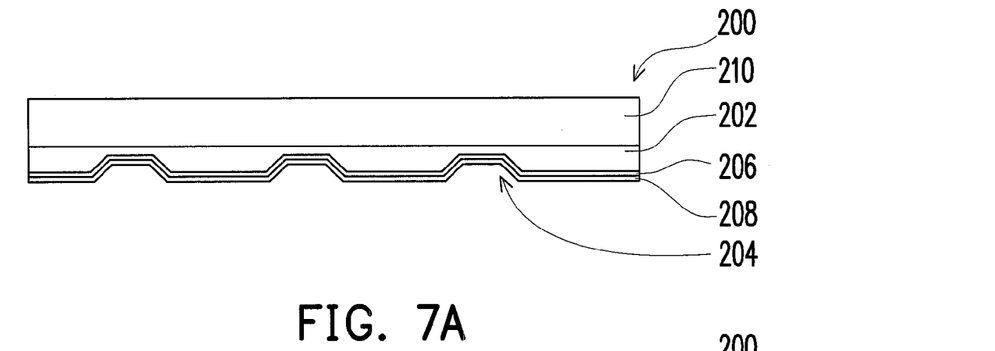
FIGS. 7A-7B are cross-sectional views of a first structure layer according to an exemplary embodiment of the disclosure.
Figure 7B:
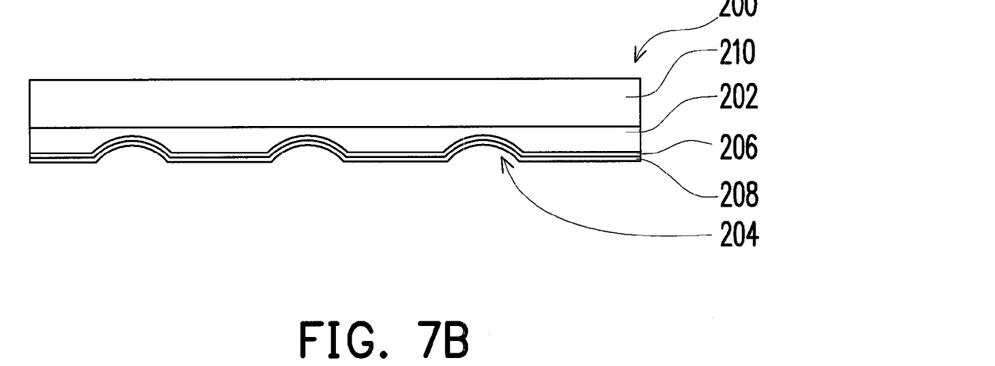

According to the above mechanism, the electrofluidic display device can be designed into a structure having a gray-level display function. In an embodiment, the trenches 164 can be disposed on one of the substrates. FIG. 6 is a structural perspective view of a first structure layer according to an exemplary embodiment of the disclosure. FIGS. 7A-7B are cross-sectional views of the first structure layer according to an exemplary embodiment of the disclosure. Referring to FIG. 6 and FIGS. 7A-7B, the first structure layer 200 includes a first substrate 210, which is, for example, a transparent material such as glass, etc. A trench structure layer 202 is disposed on the first substrate 210. The trench structure layer 202 has at least one trench 204, such as three trenches 204, respectively surrounding a predetermined position of the first substrate 210, where the predetermined position corresponds to an indent groove 222 described later with reference to FIG. 8. A cross-sectional geometric structure of the trench 204 is not limited to a specific geometric structure, which can be a trapezoid of FIG. 7A or an arc of FIG. 7B. Further, the other geometric structures can also be used, for example, a right angle groove. However, a preferable choice is that the sidewall of the trench 204 is gently inclined, so that the fluid interface is easy to reach to the balance point.

Then, a first electrode layer 206 is disposed on the first substrate 210, and is conformal with the trenches 204. A material of the first electrode layer 206 is, for example, a conductive transparent material, for example, indium tin oxide (ITO). A first hydrophobic layer 208 is disposed on the first electrode layer 206, and is conformal with the trenches 204. Moreover, if the first electrode layer 206 is not connected to a ground voltage during operation, a dielectric layer (not shown) can be added between the first electrode layer 206 and the first hydrophobic layer 208 to protect the first electrode layer 206.

Figure 8:
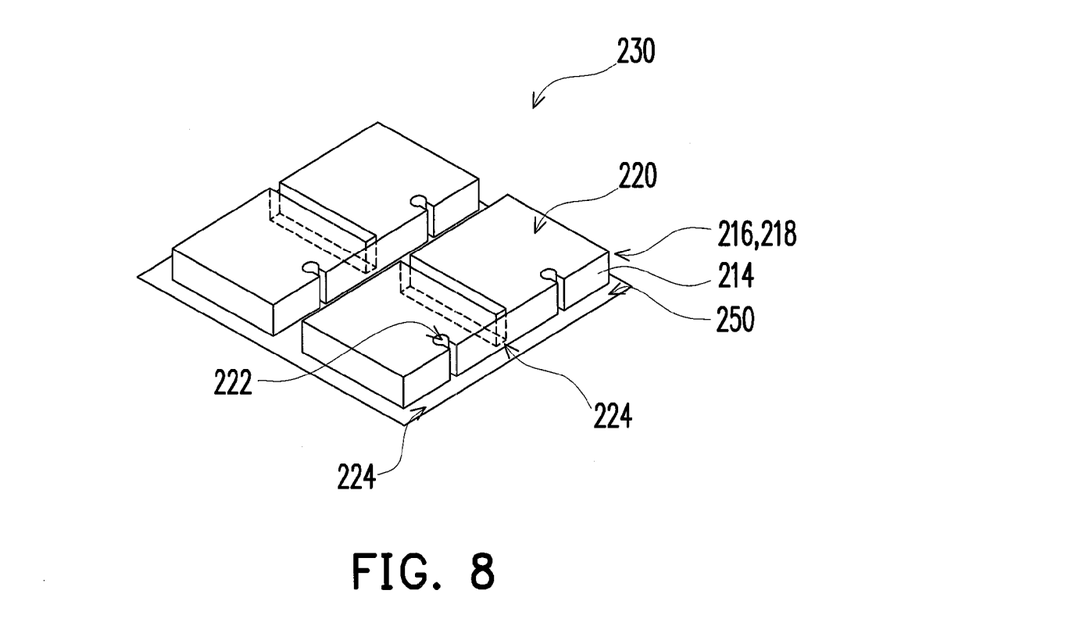
FIG. 8 is a structural perspective view of a second structure layer according to an exemplary embodiment of the disclosure.

Another structure is described below, which is also referred to as a second structure layer. FIG. 8 is a structural perspective view of the second structure layer according to an exemplary embodiment of the disclosure. Referring to FIG. 8, in the present exemplary embodiment, the trench structure is disposed on the first substrate, and a second substrate does not have the trench structure. The second structure layer 230 includes a second substrate 250, which is also a transparent material, and serves as a base of the structure. A groove structure layer 214 is disposed on the second substrate 250. The groove structure layer 214 can also be a transparent material, which allows the light to pass. The groove structure layer 214 has the indent groove 222 corresponding to the trenches 204 of FIG. 6. Positions of the indent groove 222 and the trenches 204 are mutually corresponded, so that the trenches 204 can surround the indent groove 222. The indent groove 222 is used to accommodate the polar fluid. A second hydrophobic layer 220 is formed on the groove structure layer 214. The groove structure layer 214 below the second hydrophobic layer 220 may also include a second electrode layer 216 and a dielectric layer 218. Ducts 224 are formed around the groove structure layer 214, so that the polar fluid can be driven back and forth.

Figure 9:
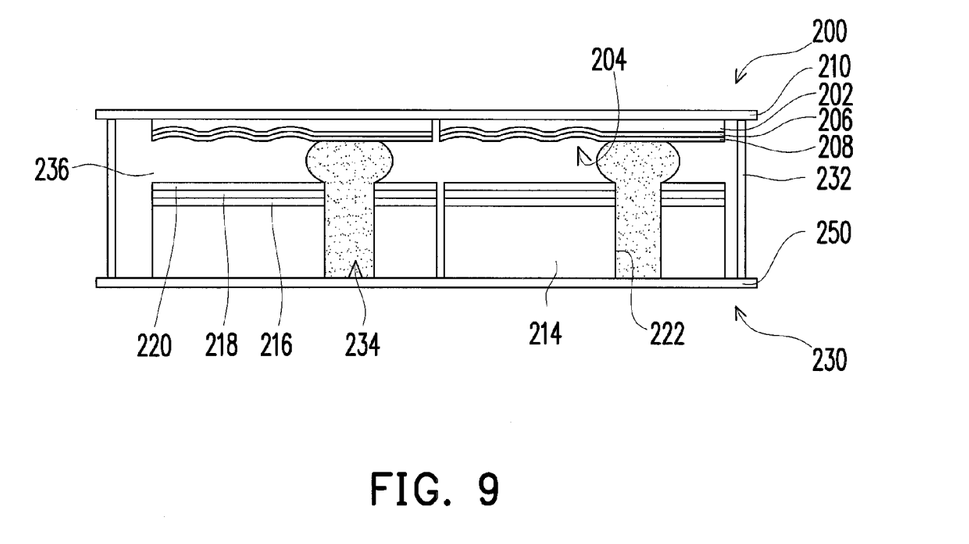
FIG. 9 is a cross-sectional view of an electrofluidic display device according to an exemplary embodiment of the disclosure.

The electrofluidic display device is formed by a combination of the aforementioned two structures. FIG. 9 is a cross-sectional view of an electrofluidic display device according to an exemplary embodiment of the disclosure. Referring to FIG. 9, the aforementioned two structure layers can be stacked to form the electrofluidic display device through a sidewall 232. Polar fluid 234 is filled in the indent groove 222. Non-polar fluid 236 is filled in the other spaces and form a fluid interface with the polar fluid 234. The polar fluid 234 has a variable contact area between the first hydrophobic layer 208 and the second hydrophobic layer 220. According to the voltages applied to the first electrode layer 206 and the second electrode layer 216, the polar fluid 234 is driven to the predetermined trench 204 to achieve a gray-level display effect. In the present exemplary embodiment, the first electrode layer 206 is maintained to the ground voltage, and an operating voltage signal is applied to the second electrode layer 216, and a driving mechanism thereof is described later. However, a method of applying the operating voltage can also be that the second electrode layer 216 is maintained to the ground voltage, and the operating voltage signal is applied to the first electrode layer 206.

The indent groove 222 may have a space for accommodating an enough amount of the polar fluid based on a suitable thickness of the groove structure layer 214 and an aperture of the indent groove 222. When the polar fluid is driven to flow out of the space, it is substantially distributed to all over the gap. Further, due to functions of adjacent pixels, the polar fluid 234 can be distributed to the whole gap. When the second electrode layer 216 is not applied with the voltage, the polar fluid 234 is pulled back to the indent groove 222 due to functions of the first hydrophobic layer 208 and the second hydrophobic layer 220. Flowing of the fluid is maintained through the ducts 224 located between the pixels.

In the present exemplary embodiment, since the trench structure layer 202 has the trenches 204, according to the mechanism described with reference of FIG. 5, the polar fluid 234 can be driven to stop at the balance position of the desired trench 204 or cover the whole the area. The area covered by each trench 204 is different, and by changing the covering area of the polar fluid 234, the gray-level display effect is achieved.

Figure 10:
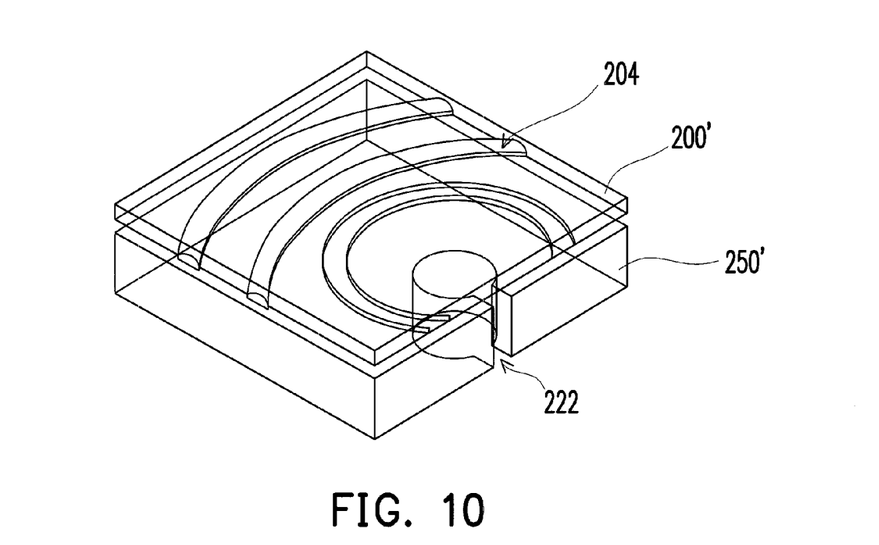
FIG. 10 is a structural perspective view of an electrofluidic display device according to an exemplary embodiment of the disclosure.

FIG. 10 is a structural perspective view of an electrofluidic display device according to an exemplary embodiment of the disclosure. Referring to FIG. 10, the electrofluidic display device has two electrode structure layers 200' and 250' located on two substrates. In the present exemplary embodiment, the trenches 204 are disposed on the first electrode structure layer 200', and the indent groove 222 is correspondingly formed on the second electrode structure layer 250' to accommodate the polar fluid. The trenches 204 surround the indent groove 222. An electric field used for driving the polar fluid is generated according to a voltage difference between the two electrode structure layers 200' and 250', so that the polar fluid can be driven to cover an area of the first electrode structure layer 200' corresponding to the area covered by the trench 204, and distributed to a predetermined area of the first electrode structure layer 200' to achieve the gray-level display effect.

According to the same design concept, the above embodiment may have other variations. For example, the geometric shape encircled by the trench 204 is unnecessarily to be an arc shape, which can also be other geometric shapes. Further, the trench 204 is unnecessarily to be disposed on the first structure layer. Namely, the trench 204 can also be disposed on the second structure layer, or disposed on both of the structure layers. Moreover, the electrode layer of one of the structure layers can be connected to the ground voltage, and the electrode layer of another structure layer is applied with the required driving voltage, so as to produce a driving force.

Figure 11:
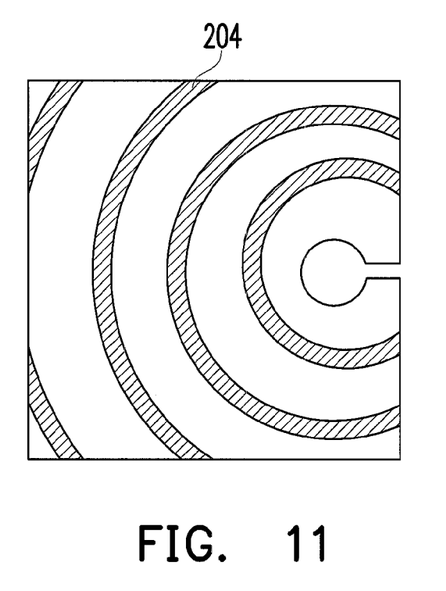
FIGS. 11-12 are schematic diagrams illustrating trench configurations of an electrofluidic display device according to an exemplary embodiment of the disclosure.
Figure 12:
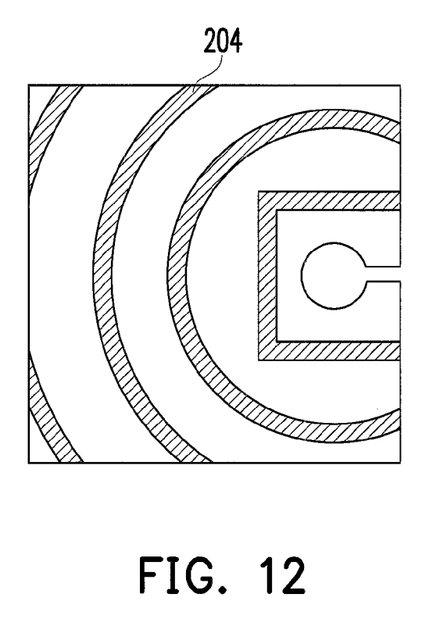

FIGS. 11-12 are schematic diagrams illustrating trench configurations of the electrofluidic display device according to an exemplary embodiment of the disclosure. Referring to FIG. 11, each of the trenches 204 is unnecessarily to be continuous, which can also be discontinuous, for example, a last trench 204 is intersected to boundary, and is configured in a discontinuous approach. Referring to FIG. 12, the trench 204 may have other suitable geometric shapes, for example, a polygon, and especially a quadrangle. Moreover, the trenches 204 are unnecessarily to have the same shape.

Generally, the number of the trenches is at least one, and the trenches respectively have a geometric shape. Further, a surrounding area surrounded by the trench has a predetermined ratio relative to the first electrode layer.

Figure 13:
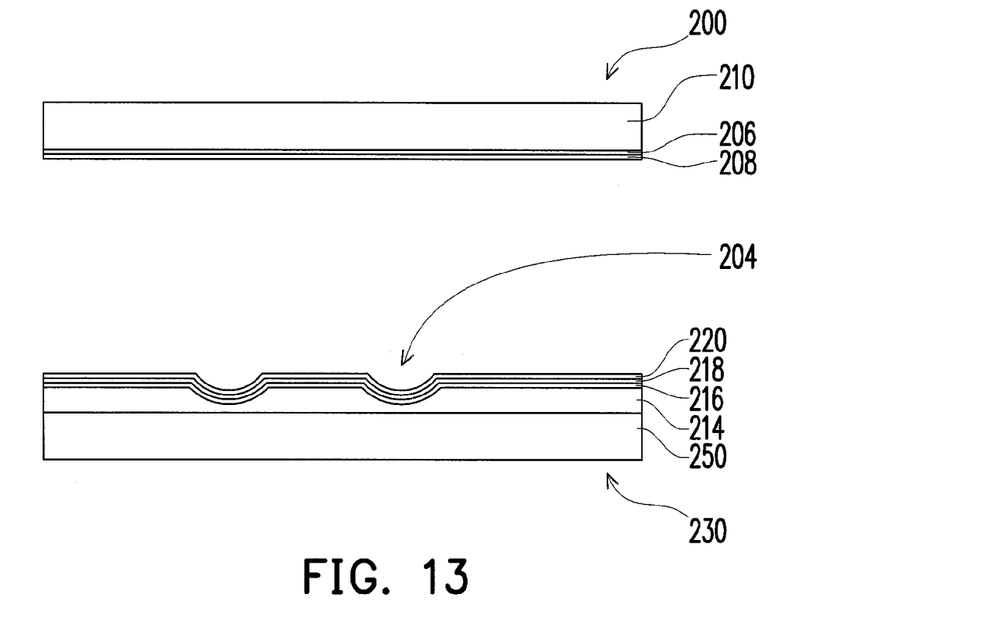
FIG. 13 is a schematic diagram illustrating a trench configuration of an electrofluidic display device according to an exemplary embodiment of the disclosure.

FIG. 13 is a schematic diagram illustrating a trench configuration of the electrofluidic display device according to an exemplary embodiment of the disclosure. Referring to FIG. 13, the trenches 204 are disposed on the second substrate 250 having the groove structure layer 214. Namely, the trenches 204 are directly formed on the groove structure layer 214 as an example.

The groove structure layer 214 has both of the trenches 204 and the indent grooves 222. Namely, referring to FIGS. 11-12, the indent groove 222 and at least one trench 204 are simultaneously formed on the second substrate 250 of the second structure layer 230. The trench 204 is expanded outwards while taking the indent groove 222 as a center, in an example. In the present exemplary embodiment, since the trench is not formed on the first substrate 210, the trench structure layer 202 of the aforementioned embodiment can be omitted to directly form the first electrode layer 206 and the first hydrophobic layer 208. If the first electrode layer 206 is applied with the driving voltage other than maintained to the ground voltage, a dielectric layer can be added between the first electrode layer 206 and the first hydrophobic layer 208 to protect the first electrode layer 206.

Figure 14:
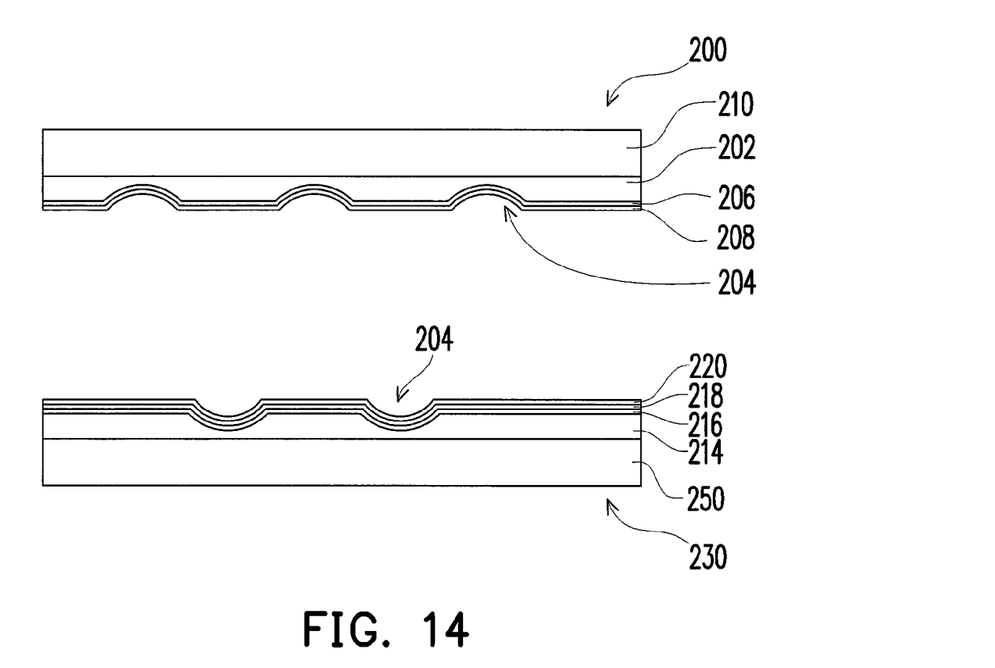
FIG. 14 is a schematic diagram illustrating a trench configuration of the electrofluidic display device according to an exemplary embodiment of the disclosure.

FIG. 14 is a schematic diagram illustrating a trench configuration of the electrofluidic display device according to an exemplary embodiment of the disclosure. Referring to FIG. 14, in the present exemplary embodiment, the two structure layers are all configured with the trenches 204. In this way, a density of the trenches is increased, so that a density of the gray-levels is increased to achieve more gray-levels.

Figure 15:
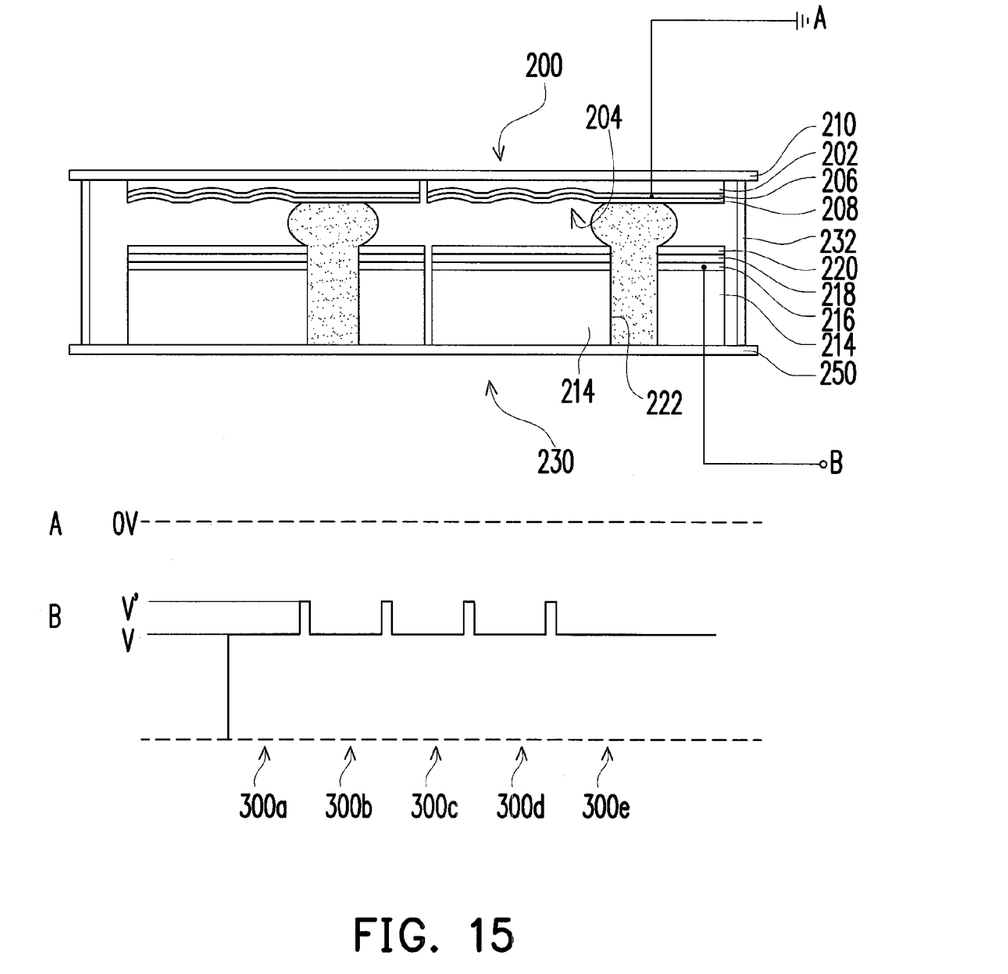
FIG. 15 is a schematic diagram illustrating a driving mechanism of an electrofluidic display device according to an exemplary embodiment of the disclosure.

FIG. 15 is a schematic diagram illustrating a driving mechanism of the electrofluidic display device according to an exemplary embodiment of the disclosure. Referring to FIG. 15, in the present exemplary embodiment, a voltage signal A of the first electrode layer 206 on the first substrate 210 is maintained to the ground voltage. A voltage waveform of a voltage signal B of the second electrode layer 216 on the second substrate 250 can be varied stage-by-stage according to the required gray-levels. During a first driving stage 300a, a voltage V is applied to drive the fluid interface between the polar fluid and the non-polar fluid to the first trench 204 and maintain stableness thereof. If the fluid interface is continuously driven to a next trench 204, a short pulse can be applied during an initial stage of a next driving stage 300b, and a voltage V' thereof is higher than the voltage V. A function of such pulse is to destroy the balance state to drive the fluid interface to leave the first trench 204, and then the voltage V is applied to drive the fluid interface to the next trench 204. A pulse width and height of the short pulse can be adjusted according to an actual requirement as long as it can drive the fluid interface to leave the first trench 204. According to the above driving mechanism, after operations of several driving stages 300a-300e, the colored polar fluid can be distributed to the area of the corresponding gray-level to achieve the gray-level display. If the display is to be deactivated, as long as the voltage signal B is changed to the ground voltage, the polar fluid may flow back to the indent groove.

As described above, the voltage waveforms of the voltage signal A and the voltage signal B can be exchanged. Namely, the voltage signal B can also be maintained to the ground voltage, and the voltage signal A is the driving voltage. Alternatively, the voltage signal A and the voltage signal B can function in collaboration to achieve the driving effect. Change of each gray-level is implemented by driving the fluid interface from one trench to a next trench.

In summary, in the disclosure, a trench structure is formed on the electrofluidic display device, so that the gray-level display effect can be achieved through a suitable driving voltage.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electrofluidic display device, comprising:
   a first structure layer, comprising:
      a first substrate;
      a trench structure layer, disposed on the first substrate and having at least one trench correspondingly surrounding an indent groove of a second substrate;
      a first electrode layer, disposed on the first substrate, and being conformal with the at least one trench; and
      a first hydrophobic layer, disposed on the first electrode layer, and being conformal with the at least one trench;
   a second structure layer, comprising:
      the second substrate, located at one side of the first substrate with a gap;
      a groove structure layer, disposed on the second substrate, wherein the groove structure layer has the indent groove surrounded by the trench of the first substrate;
      a second electrode layer, disposed on the groove structure layer; and
      a second hydrophobic layer, disposed on the second electrode layer;
   polar fluid, disposed in the indent groove and contacting the first hydrophobic layer, and
   non-polar fluid, disposed in the gap between the first substrate and the second substrate.

2. The electrofluidic display device as claimed in claim 1, wherein the second structure layer has the indent groove and at least one trench, and the trench is expanded outwards while taking the indent groove as a center.

3. The electrofluidic display device as claimed in claim 2, wherein the trenches are located on both of the first and the second substrates.

4. The electrofluidic display device as claimed in claim 1, wherein the second substrate further comprises a dielectric layer between the second electrode layer and the second hydrophobic layer.

5. The electrofluidic display device as claimed in claim 1, wherein the at least one trench has a geometric shape, and a surrounding area surrounded by the trench has a predetermined ratio relative to the first electrode layer.

6. The electrofluidic display device as claimed in claim 1, wherein a cross section structure of the at least one trench has a most indent area forming a balance point.

7. An electrofluidic display device, comprising:
   a first structure layer, comprising:
      a first substrate;
      a first electrode layer, disposed on the first substrate; and
      a first hydrophobic layer, disposed on the first electrode layer;

a second structure layer, comprising:
- a second substrate, located at one side of the first substrate with a gap;
- a groove structure layer, disposed on the second substrate, wherein the groove structure layer has an indent groove and at least one trench surrounding the indent groove;
- a second electrode layer, disposed on the groove structure layer, and being conformal with the at least one trench; and
- a second hydrophobic layer, disposed on the second electrode layer, and being conformal with the at least one trench;

polar fluid, disposed in the indent groove and contacting the first hydrophobic layer, and non-polar fluid, disposed in the gap between the first substrate and the second substrate.

8. The electrofluidic display device as claimed in claim 7, wherein the second substrate further comprises a dielectric layer between the second electrode layer and the second hydrophobic layer.

9. The electrofluidic display device as claimed in claim 7, wherein the at least one trench has a geometric shape, and a surrounding area surrounded by the trench has a predetermined ratio relative to the first electrode layer.

10. The electrofluidic display device as claimed in claim 7, wherein a cross section structure of the at least one trench has a most indent area forming a balance point.

11. An electrofluidic display device, comprising:
- a first structure layer, comprising:
  - a first substrate; and
  - a first electrode structure layer, comprising a first electrode layer, and disposed on the first substrate;
- a second structure layer, comprising:
  - a second substrate, located at one side of the first substrate with a gap; and
  - a second electrode structure layer, comprising a second electrode layer, and disposed on the second substrate, wherein the second electrode structure layer has an indent groove;
- polar fluid, disposed in the indent groove and contacting the first electrode structure layer, and
- non-polar fluid, disposed in the gap between the first substrate and the second substrate,
- wherein at least one of the first electrode structure layer and the second electrode structure layer has at least one trench surrounding the indent groove.

12. The electrofluidic display device as claimed in claim 11, wherein the second electrode structure layer comprises:
- a groove structure layer, disposed on the second structure layer, wherein the groove structure layer has the indent groove;
- the second electrode layer, disposed on the groove structure layer; and
- a hydrophobic layer, disposed on the second electrode layer.

13. The electrofluidic display device as claimed in claim 12, wherein the groove structure layer has the at least one trench surrounding the indent groove, wherein the second electrode layer and the hydrophobic layer are conformal with the trench.

14. The electrofluidic display device as claimed in claim 11, wherein the first electrode structure layer comprises a hydrophobic layer disposed on the first electrode layer.

15. The electrofluidic display device as claimed in claim 14, wherein the first electrode structure layer further comprises a trench structure layer located on the first structure layer, and has the at least one trench surrounding the indent groove, wherein the first electrode layer and the hydrophobic layer are disposed on the trench structure layer and are conformal with the trench.

16. The electrofluidic display device as claimed in claim 11, wherein the first electrode structure layer and the second electrode structure layer respectively have the at least one trench.

17. The electrofluidic display device as claimed in claim 11, wherein the at least one trench has a geometric shape surrounding the indent groove, and forms a surrounding area.

18. The electrofluidic display device as claimed in claim 11, wherein a cross section structure of the at least one trench has a most indent area forming a balance point.

19. A driving method of an electrofluidic display device, wherein the electrofluidic display device comprises:
- a first structure layer, comprising:
  - a first substrate; and
  - a first electrode structure layer, comprising a first electrode layer, and disposed on the first substrate;
- a second structure layer, comprising:
  - a second substrate, located at one side of the first substrate with a gap; and
  - a second electrode structure layer, comprising a second electrode layer, and disposed on the second substrate, wherein the second electrode structure layer has an indent groove;
- polar fluid, disposed in the indent groove and contacting the first electrode structure layer; and
- non-polar fluid, disposed in the gap between the first substrate and the second substrate,
- wherein at least one of the first electrode structure layer and the second electrode structure layer has at least one trench surrounding the indent groove, and the polar fluid and the non-polar fluid have a fluid interface,
- wherein the driving method comprises: applying a voltage signal between the first electrode layer and the second electrode layer by issuing
- a first voltage for driving the polar fluid to flow, so that the fluid interface is moved to a balance point of the trench.

20. The driving method of the electrofluidic display device as claimed in claim 19, further comprising:
- applying a start voltage to move the fluid interface from the balance point; and
- applying a second voltage to drive the polar fluid to flow, so that the fluid interface is moved to a next balance point.

21. The driving method of the electrofluidic display device as claimed in claim 20, wherein the start voltage is higher than the first voltage, and a duration needed for an application of the start voltage is as long as the fluid interface is moved away from the balance point.

22. The driving method of the electrofluidic display device as claimed in claim 20, wherein the balance points are located on the first electrode structure layer or the second electrode structure layer.

* * * * *